2,899,321

DIELECTRIC MATERIALS

Isadore Mockrin, Philadelphia, Pa., assignor to Pennsalt Chemicals Corporation, a corporation of Pennsylvania No Drawing. Application May 21, 1956
Serial No. 586,323

7 Claims. (Cl. 106—39)

This invention relates to new dielectric materials and their use for electrical purposes including their use in capacitors and for obtaining piezoelectric effects.

Since about 1940, when the high dielectric constant of compositions based on barium titanate were discovered, increased interest has been shown in the use of ceramics formed from barium titanate, calcium titanate and strontium titanate particularly with respect to the use of ceramic elements formed of these materials as capacitors and electromechanical converters of the piezoelectric type. With respect to the high dielectric constant of these materials, particularly barium titanate, and the use of ceramic bodies based on barium titanate as the dielectric in capacitors and for preparing electromechanical converters of the piezoelectric type, attention is called to the publication "Titanate Ceramics for Electromechanical Purposes" by Hans Jaffe, appearing in Industrial and Engineering Chemistry, vol. 42, page 264, February 1950.

One of the primary advantages of these materials, particularly with respect to their use as electromechanical converters, is that it is not necessary to use them in the form of single crystals to obtain the desired piezoelectric effect. Instead, the materials can be used in the form of ceramic bodies and can, therefore, be molded into any desired shape or size. This naturally is of particular advantage where it is desired to provide ultrasonic energy for commercial purposes.

One of the difficulties with respect to the use of calcium, strontium, or barium titanate is the high firing temperatures necessary to obtain the desired ceramic bodies. These temperatures generally lie in the range of 1300° to 1350° C.

It has now been discovered that certain complex metal fluorides have substantially the same physical structure as the heretofore mentioned titanates and possess, possibly due to this similarity in crystal structure, similar electrical properties in that ceramic bodies based on these complex metal fluorides have similarly high dielectric constants and have a high strength piezoelectric effect when polarized by a direct current high voltage polarizing field in the manner described in the heretofore mentioned Industrial and Engineering Chemistry article, the complex metal fluorides behaving in a manner similar to that described for barium titanate.

The complex metal fluorides, besides having the desirable electrical properties of the heretofore mentioned titanates, have the additional desirable characteristic of forming ceramic bodies at reasonably low firing temperatures, the firing temperature needed for forming ceramic bodies of these materials generally ranging in the order of about 700° to 1000° C. The complex metal fluorides also substantially reduce the firing temperature and time of the calcium, strontium, or barium titanate when mixed therewith prior to firing while still maintaining in the final product the desirable high dielectric constant and electromechanical properties.

The particular complex metal fluoride ceramics which have been found to have these properties and to which the present invention is drawn are prepared by compressing and firing complex metal fluorides of the type $ARF_3$, where A is monovalent Li, Na, K, Cu, Rb, Cs, Ag or Tl, and R is divalent Mn, Fe, Co, Ni, Mg, Zn or Pb. The preferred complex metal fluoride ceramics are prepared from any one or more of the compounds potassium nickel fluoride ($KNiF_3$), potassium zinc fluoride ($KZnF_3$), potassium iron fluoride ($KFeF_3$), potassium cobalt fluoride ($KCoF_3$), potassium manganese fluoride ($KMnF_3$), potassium magnesium fluoride ($KMgF_3$) and rubidium zinc fluoride ($RbZnF_3$).

The complex metal fluorides from which the ceramic bodies of the present invention are prepared may be made by the process described in U.S. Patent No. 2,659,658 of November 17, 1953. In accordance with this process, an alkali metal fluosilicate is mixed, in a finely dry state, preferably by grinding with a metal sulfate, in molar proportions of 3 mols of the alkali metal fluosilicate to 2 mols of the metal sulfate. The reaction is carried out by heating the reactants at a temperature of at least 200° C. but below that at which any appreciable melt occurs. The temperature generally used lies roughly in the range of about 450° to 650° C. During the reaction silicon tetrafluoride is given off and completion of the reaction can be determined by checking the weight loss, the reaction being complete after no further weight loss is indicated. The reaction generally takes from about 1½ to 2 hours. However, to assure that the reactants are completely mixed and that the reaction is complete it is generally preferable, after heating the reactants for about 1½ to 2 hours at about 600° to 650° C., to then cool the reaction mixture, and regrind the same, and then again heat the mixture for several more hours at a temperature of about 600° to 650° C. After this the insoluble complex metal fluoride is separated from the soluble alkali metal sulfate residue by extraction with water. The water insoluble complex metal fluoride is then dried.

The probable reaction producing the three end products, viz, a complex metal fluoride, silicon tetrafluoride and alkali metal sulfate may be represented as follows (starting for example with $MgSO_4$ and $K_2SiF_6$):

$2MgSO_4 + 3K_2SiF_6 \cdot 2K_2SO_4 + 3SiF_4 + 2KMgF_3$.

In forming the ceramic bodies, the complex metal fluoride is first compressed into the desired form and then fired by heating to a temperature of about 700° to 1000° C. The preferred temperature depends somewhat on the particular complex metal fluoride or mixtures of complex metal fluorides being used. Conventional bonding pressures are employed, these generally ranging from about 1,000 to well over 20,000 lbs./sq. in.

The bonding of the complex metal fluorides may be done by the usual techniques including dry pressing, but it is generally preferred to use a suitable binder which will hold the powder in the desired shape during the firing process. However, the binder material should be such that it will be given off well below the actual firing temperature. Many such binding materials are known in the ceramic art and may be used if desired. The firing should be carried out under substantially anhydrous conditions.

As previously stated, excellent ceramic bodies can be obtained either by using a single complex fluoride of the type described or mixtures of these complex metal fluorides. Where the ceramic is made from a mixture of two or more of the complex metal fluorides, the ceramic body is made in the manner described, that is, by first compressing the mixture of finely divided complex metal fluorides into the desired form and then firing the formed body within the temperature range described under substantially anhydrous conditions.

Not only can ceramic bodies similar to the barium titanate, calcium titanate and strontium titanate ceramics described in the heretofore mentioned article "Titanate Ceramics for Electromechanical Purposes" be obtained, but it has been found that by blending the particular complex metal fluorides, as heretofore mentioned, with finely divided barium titanate, calcium titanate or strontium titanate, ceramic bodies, having properties similar to those possessed by the titanate ceramics alone, can be obtained while substantially reducing the firing temperature required to obtain the ceramic. Thus while the barium, calcium, or strontium titanate require firing temperatures of about 1300° to 1350° C. in order to obtain satisfactory ceramic bodies, a finely divided mixture of 1 part $KMgF_3$ + 4 parts of $BaTiO_3$ when compressed as described and fired at a temperature of about 850° C gave an excellent ceramic body.

Though apparently the complex metal fluorides can be mixed in all proportions with calcium titanate, strontium titanate or barium titanate and ceramic bodies be obtained; where the complex metal fluoride is added primarily for the purpose of reducing the firing temperature, it is generally preferred that the titanates comprise at least 70% of the mixture prior to firing.

The following examples help to further illustrate the practice of the present invention. The examples are given by way of illustration only and the invention is not to be limited thereto.

*Example I*

A finely divided dry potassium magnesium fluoride was prepared by grinding together substantially dry potassium fluosilicate and magnesium sulfate in the molar proportions of about 3 mols potassium fluosilicate to 2 mols magnesium sulfate. The grinding was carried out in a dry nitrogen atmosphere. The ground mixture was then heated for about 1¾ hours at 650° C. after which it was permitted to cool, then reground and fired for an additional 16 hours at 650° C. The reaction mixture was then slurried in water to extract the soluble potassium sulfate formed during the reaction.

The remaining potassium magnesium fluoride ($KMgF_3$) was dried, mixed with absolute alcohol and then pressure-molded into the form of a disc of one (1) inch diameter and one-eighth (⅛) inch thickness. A pressure of 20,000 lbs./sq. in. was used. The disc was then placed in a furnace in a dry nitrogen atmosphere. Initial heating was done slowly, the disc being heated for ½ to 1 hour to prevent rupture. The temperature was then raised to about 850° C. and the molded article fired at this temperature for about 1 hour after which time the furnace was cut off and allowed to cool slowly to room temperature. The firing converted the disc into a hard, dense ceramic body that could not be broken by bending with the fingers.

In order to determine whether a ceramic body could be obtained from the initial reactants without first preparing the complex metal fluoride, a finely ground mixture of potassium fluosilicate and magnesium sulfate was ground together in the proportion of 3 mols $K_2SiF_6$ to 2 mols $MgSO_4$. This mixture was then wet with absolute alcohol and compressed into a disc of similar size to that previously described at a pressure of 20,000 lbs./sq. in. The formed disc was then fired in a dry nitrogen atmosphere, in the same manner as described in preparing the $KMgF_3$ ceramic. After the firing was completed, the molded disc was removed and it was found that a ceramic body was not obtained. Rather than a hard, dense, strong ceramic specimen being obtained, as had occurred on firing the molded potassium magnesium fluoride, the disc crumbled easily in the hand.

*Example II*

A potassium nickel fluoride ($KNiF_3$) ceramic was prepared from dry finely divided potassium nickel fluoride prepared through the reaction of 3 mols potassium fluosilicate with 2 mols nickel fluoride in the manner described for preparing the potassium magnesium fluoride. The finely divided potassium nickel fluoride was then wet with absolute alcohol and compressed into a cylindrical wafer or disc of about 1 inch diameter and ⅛ inch thickness at a pressure of about 20,000 lbs./sq. in. This disc was then fired in a nitrogen atmosphere at a temperature of 750° C. The firing was done by initially heating for about ½ hour at a temperature of about 100° C., after this the temperature was increased to 750° C. and the furnace then shut off and allowed to cool slowly to room temperature.

The resulting ceramic discs were not quite as strong as those prepared from potassium magnesium fluoride.

*Example III*

In a manner similar to that of Examples I and II, discs of about 1 inch diameter and ⅛ inch thickness were prepared by compressing finely divided potassium zinc fluoride ($KZnF_3$). Some of these discs were fired at 750° C. while others were fired at 850° C., the firing being carried out in a dry nitrogen atmosphere as previously described. Though in each case, excellent ceramics were prepared, the discs fired at the lower temperature of 750° C. were found to be somewhat better than the ceramics obtained from the potassium zinc fluoride by firing at 850° C.

*Example IV*

One part by weight of finely divided dry potassium magnesium fluoride ($KMgF_3$) was mixed together with 4 parts by weight of finely divided potassium zinc fluoride ($KZnF_3$). This mixture was wet with absolute alcohol and molded into the form of discs as described in the preceding examples. The compressed discs were then fired at a temperature of 850° C. Excellent ceramics were obtained. In a similar manner, ceramic discs were prepared from a blend of 1 part potassium magnesium fluoride and 4 parts of barium titanate. After wetting with absolute alcohol and compressing to form discs, the discs were fired at a temperature of 850° C. in the manner described in Example I. Excellent ceramic speciments were obtained.

The present application is a continuation-in-part of application Serial No. 308,503, filed September 8, 1952, now abandoned.

Having thus described my invention, I claim:

1. A formed, fired, dielectric ceramic body prepared by firing a compacted mass of a finely divided material to produce intimate bonding of the particles thereof, and consisting essentially of a material selected from the group consisting of complex fluorine compounds of the formula $ARF_3$ where A is an element selected from the group consisting of monovalent Li, Na, K, Cu, Rb, Cs, Ag, and Tl, and R is an element selected from the group consisting of divalent Mn, Fe, Co, Ni, Mg, Zn and Pb, and mixtures of such compounds.

2. A ceramic body of claim 1 wherein the complex metal inorganic fluorine compound is $KNiF_3$.

3. A ceramic body of claim 1 wherein the complex metal inorganic fluorine compound is $KZnF_3$.

4. A ceramic body of claim 1 wherein the complex metal inorganic fluorine compound is $KCoF_3$.

5. A ceramic body of claim 1 wherein the complex metal inorganic fluorine compound is $KMnF_3$.

6. A ceramic body of claim 1 wherein the complex metal inorganic fluorine compound is $KMgF_3$.

7. The method of making the ceramic bodies of claim 1 comprising forming the finely divided starting material into a compact form and then firing said formed starting material in a dry atmosphere at a temperature of about 700° to 1000° C.

References Cited in the file of this patent

UNITED STATES PATENTS

| | | |
|---|---|---|
| 1,198,033 | Hershman | Sept. 12, 1916 |
| 2,606,812 | Bruce | Aug. 12, 1952 |
| 2,659,658 | La Lande et al. | Nov. 17, 1953 |

OTHER REFERENCES

Duboin: "Comptes Rendus de Academie des Sciences," vol. 120, pages 678–680, 1895.